(12) United States Patent
Barmore

(10) Patent No.: US 8,944,146 B2
(45) Date of Patent: Feb. 3, 2015

(54) MODULAR, FLUID THERMAL TRANSFER DEVICE

(75) Inventor: Robert P. Barmore, Portsmouth, NH (US)

(73) Assignee: Therma-Hexx Corporation, Portsmouth, NH (US)

( * ) Notice: Subject to any disclaimer, the term of this patent is extended or adjusted under 35 U.S.C. 154(b) by 923 days.

(21) Appl. No.: 13/117,098

(22) Filed: May 26, 2011

(65) Prior Publication Data

US 2012/0298331 A1 Nov. 29, 2012

(51) Int. Cl.
| F24H 3/00 | (2006.01) |
| F25B 29/00 | (2006.01) |
| F28F 3/12 | (2006.01) |
| F24J 2/00 | (2014.01) |
| E04B 9/04 | (2006.01) |
| F24J 2/04 | (2006.01) |
| E04C 2/52 | (2006.01) |

(52) U.S. Cl.
CPC ............ E04B 9/0464 (2013.01); E04B 9/0421 (2013.01); F24J 2/0438 (2013.01); E04C 2/525 (2013.01); *Y02E 10/44* (2013.01); *Y02B 10/20* (2013.01)
USPC ............. 165/47; 165/168; 165/48.2; 126/569

(58) Field of Classification Search
USPC ............. 165/47, 56, 168, 172, 48.2; 126/622, 126/623, 569; 52/126.5, 220.1–220.8, 263; 237/69
See application file for complete search history.

(56) References Cited

U.S. PATENT DOCUMENTS

| 4,306,616 | A | * | 12/1981 | Woods et al. | 165/136 |
| 4,553,587 | A | * | 11/1985 | Traylor | 165/95 |
| 6,899,169 | B1 | * | 5/2005 | Cox | 165/159 |
| 2004/0251011 | A1 | * | 12/2004 | Kudo | 165/172 |
| 2006/0107618 | A1 | * | 5/2006 | Hydock | 52/782.1 |

FOREIGN PATENT DOCUMENTS

| JP | 10253086 | 9/1998 |
| JP | 2000130779 | 5/2000 |
| WO | 03322349 | 11/2003 |
| WO | 2006064531 | 6/2006 |
| WO | WO 2006064531 A1 * | 6/2006 |
| WO | 2010150086 | 12/2010 |

OTHER PUBLICATIONS

International Search Report and Written Opinion for PCT/US2012/039008 mailed Dec. 26, 2012.

* cited by examiner

*Primary Examiner* — Allen Flanigan
*Assistant Examiner* — Jon T Schermerhorn
(74) *Attorney, Agent, or Firm* — Workman Nydegger

(57) ABSTRACT

A modular thermal panel comprising a paver having a top and bottom surface, and a heat exchanger having connected top and bottom panels with channels formed there between for receiving a heat exchange fluid. The top panel of the heat exchanger is coupled to the bottom surface of the thermal mass unit, an insulator panel is coupled to the bottom panel of the heat exchanger, and inlet and outlet tubes are coupled to the heat exchanger for feeding heat exchange fluid to and from the heat exchanger. The size of the heat exchanger is substantially equal to the size of the paver and the edges of the heat exchanger are substantially aligned with the edges of the paver. The heat exchanger is made of thermally transmissive material including polymers, stainless steel, aluminum, or copper and the thermal mass unit is made of a material which includes modular or pre-formed or formed in place concrete, cement, gypsum concrete, or stone.

16 Claims, 8 Drawing Sheets

MODULAR, FLUID THERMAL TRANSFER DEVICE

BACKGROUND OF THE INVENTION

1. Field of the Invention

The present invention relates to apparatus for the transfer of thermal energy between a thermal mass object and a fluid contained and transited within a heat exchanger and, more specifically, to a modular thermal panel that can be easily connected and disconnected to other modular thermal panels to form an array of modular thermal panels which can be used to transfer solar generated heat on a flat surface such as a roof top patio to heat domestic water or as a patio around a pool to heat the pool while concurrently, cooling the patio surface, or to transfer heat into the patio for the purpose of melting snow and ice on the surface.

2. Background of the Invention

The transfer of thermal energy between thermal mass objects such as concrete or stone, and fluid transited within tubes is now well known within the art. This system is often used for radiant heating. Alternately, when heat is transferred from a thermal mass to the fluid, the process is often used for solar heat collection and/or thermal mass cooling. Typically, some form or type of round tubing is used to contain and transit the fluid. The most common type of tubing in use currently is known as cross linked polyethylene or pex. Pex tubing is usually embedded in a concrete slab or fastened underneath a floor. Fluid is transited through the tube and thermal transfer occurs between the fluid and tube and subsequently the tube and the adjacent thermal mass.

The limitations of this system are; (a) that it cannot be joined directly with pre-formed paver or slab units, specifically paver/slab units that are elevated on pedestals; (b) they require a continuous monolithic mass to contain the tubes, (c) they are not easily repaired; (d) they cannot be disassembled and re-assembled, (e) due to the manufacturing limits of continuous extruded tubing, the interior surface is smooth and linear causing the fluid to flow linearly through the smooth round tubes. This causes inefficiency in the transfer of thermal energy between the fluid and tube surface, commonly known in the art as a boundary layer that is created by the linearly flowing fluid; (f) the long continuous runs of tubing can expand and contract causing ticking and clicking noise within the system, (g) when the concrete slab that encases the tubing deteriorates and has to be replaced, the tubing has to be replaced as well due to damage to the tubing during the demolition of the concrete, (h) the constant expansion and contraction of the tubing accelerates the deterioration of the concrete slab causing premature failure of the concrete, (i) if the tubing is subject to freezing without the proper anti freeze in the fluid, failure of the tube will result, thus causing the concrete slab to have to be demolished in order to repair the tubing.

The current art for pipe or tube connectors include but are not limited to the push on type utilizing O-rings, glue on and compression connectors. When removed, the compression type leaves a mark or deformation on the surface of the tube that they were locked onto. These deformations can cause leakage if re-connected. These connectors in their present form are not acceptable for use where the connected tubes need to be re-used after they have been connected and disconnected. Glue on connectors take more time to install, have a potential to leak, if they do leak they cannot be replaced easily within the array, they cannot be disassembled and reassembled and are limited to use with materials that are suitable for gluing. The push on O-ring type are suitable for modular connections due to the ability to remove and replace them at will, their ability to be flexed and rotated without leaking, and their ability to allow for expansion and contraction in the joint.

Thermal panels for transferring heat are known in the prior art. More specifically, by way of example, U.S. Pat. No. 4,164,933 to Alosi discloses fluid passageways that are not separate from the monoliths and are not insulated. Further, they are not connected by a flexible connector joint. Further, the fluid channels are not replaceable. The invention would not be usable in connection with removable, reusable, repairable paver/slabs that can be mounted on pedestals. The use of the monoliths own material for the formation of the passageways would be impractical from a manufacturing and practicality standpoint where fluid is used as leakage could occur due to absorption or cracking. The Alosi invention or other fluid thermal transfer devices that use extruded tubing heretofore known suffer from a number of disadvantages and limitations such as:

(a) They cannot be nested with paver/slabs that are raised on pedestals.
(b) They cannot be easily disassembled and reassembled without causing damage to the components.
(c) They don't utilize flexible leak proof flexible connections between units.
(d) They are not practical or economical to manufacture in a modular form.

SUMMARY OF THE INVENTION

The present invention solves the aforementioned problems and creates many new opportunities for the use of thermal transfer between fluids and thermal mass by being modular with a simple connector between modular units. The modularity of the units allows them to: (a) Be manufactured to match a particular size paver/slab/stone unit and to be able to be arrayed with other paver/slab/stone units creating a highly efficient transfer of thermal energy between the fluid and thermal mass, (b) The modular units can be disassembled and re-assembled to allow for repairs to the system, replacement of damaged or broken paver/slabs or to gain easy access to the area below a paver surface, (c) Be removed and replaced within a row of units without having to remove the entire patio, and (d) Function as invisible solar collectors.

Further, the present invention can include a re-usable connector that is designed to fit within the physical limits of this invention, not cause harm to the inlet/outlet tubes, allow for vertical movement between the units and allow for expansion and contraction between the units while maintaining a redundant leak proof connection.

It is common for flat roofed buildings, plazas and patios to have paver/slabs installed on pedestals or in direct contact with the ground. These pavers can get very hot and create urban heat islands thus heating the atmosphere above the buildings, creating higher temperatures in the environment. Certain municipalities require the use of "cool roofs" to lower the incidence of urban heat islands.

In one aspect of this invention the use of this invention on a rooftop, plaza or patio application will allow for the heat accumulated in the paver/slabs to be transferred into the domestic hot water system of the building while simultaneously cooling the roof top patio, plaza or patio thus lowering the effect of the urban heat island.

In another aspect of this invention the thermal transfer process can be reversed in winter weather to melt any accumulated snow on the surface of the paver/slabs.

A further aspect of this invention is to surround a swimming pool with the paver units and use the solar heat gain in the pavers/slabs to heat the swimming pool while simultaneously cooling the patio.

A still further aspect of the invention is to connect the units to a geo thermal loop to remove excessive heat from the thermal mass in hot climates and to transfer heat to the thermal mass in cold climates, thus making the paver/slab system compatible with alternative energy sources.

A still further aspect of the invention is for use as radiant in floor or in wall heating or cooling.

A still further aspect of the invention is to transit chilled fluid through the system to create a comfortable walking surface in very hot climates.

Yet another advantage of the present invention is that the push on connectors between units allows for a leak proof connection while allowing for flex, expansion and contraction.

Still another advantage of the present invention is that the modular nature of the invention allows for individual units to be removed from a row for any necessary repairs to be made to the units, access to swimming pool plumbing, the substrate or roof and the supply/return plumbing for the system.

In an exemplary embodiment of the present invention, there is disclosed a modular thermal panel comprising:

a thermal mass unit having a top and bottom surface;

a heat exchanger having connected top and bottom panels with channels formed there between for receiving a heat exchange fluid, the top panel of the heat exchanger being coupled to the bottom surface of the paver;

an insulator panel coupled to the bottom panel of the heat exchanger; and inlet and outlet tubes coupled to the heat exchanger for feeding heat exchange fluid to and from the heat exchanger;

wherein the size of the heat exchanger is equal to the size of the thermal mass unit and the edges of the heat exchanger are aligned with the edges of the thermal mass unit;

wherein the heat exchanger is made of thermally transmissive material including polymers, stainless steel, aluminum or copper;

wherein the thermal mass unit is made of a material which includes modular or formed in place concrete, cement, gypsum concrete, gypsum or stone.

The more important features of the invention have thus been outlined in order that the more detailed description that follows may be better understood and in order that the present contribution to the art may better be appreciated. Additional features of the invention will be described hereinafter and will form the subject matter of the claims that follow.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DESCRIPTION OF THE PREFERRED EMBODIMENT

Figure 1:
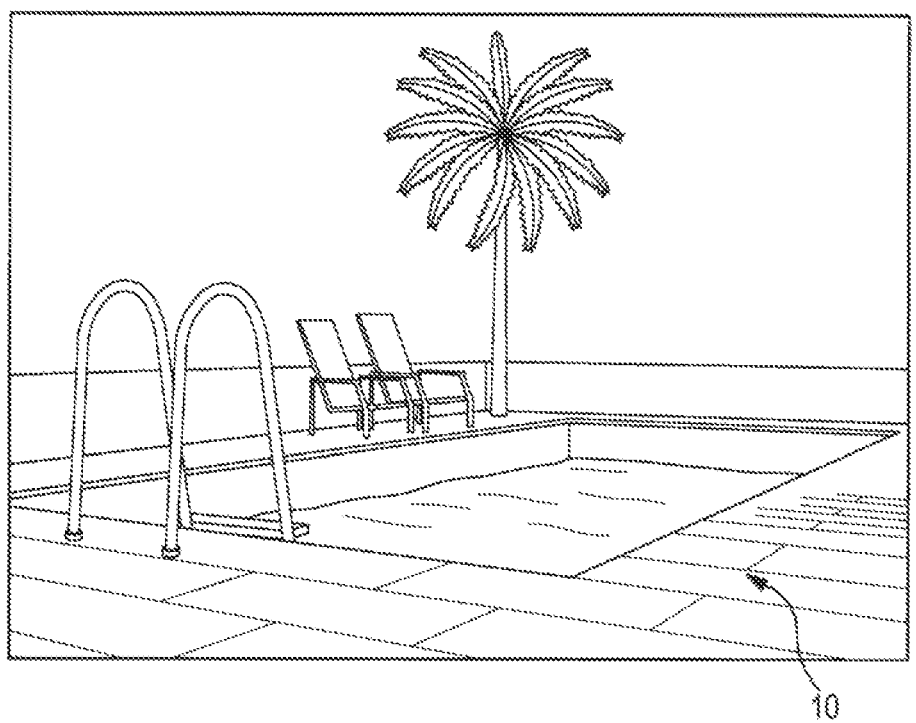
FIG. 1 is a view of thermal panels here disclosed on a roof top patio of a high rise building where the heat from the sun is absorbed by the panels and is used to heat the water in the pool.

The invention is a modular, fluid thermal transfer device made up of a thermal panel which may be, but is not limited to a standard two feet by two feet architectural concrete paver with a thickness of between one inch and three inches coupled to a powder coated roll bonded heat exchanger. Referring to FIG. 1, there is shown a view of thermal panels 10 here disclosed arranged in rows and columns on a roof top patio of a high rise building where the heat from the sun is absorbed by the panels and is used to heat a fluid.

The panels can be used to collect solar heat energy when placed on balconies, terraces, low sloping roofs, plazas, sidewalks, patios, roof top patios, and pool patios. The collected energy can be used to heat domestic water, pool water, stored water for future heating and heat pumps. The removal of the heat from the paver surface will help to cool the surface making for a more comfortable and usable environment.

Figure 2:
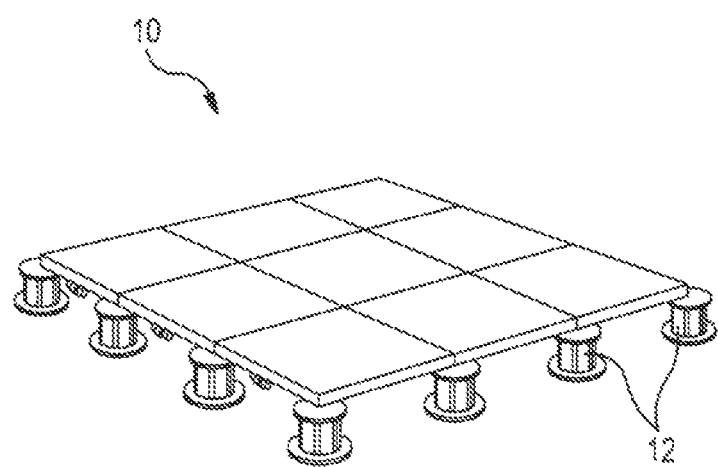
FIG. 2 is a perspective view of an array of nine thermal panels mounted on pedestals in accordance with the principles of the invention.
Figure 7:
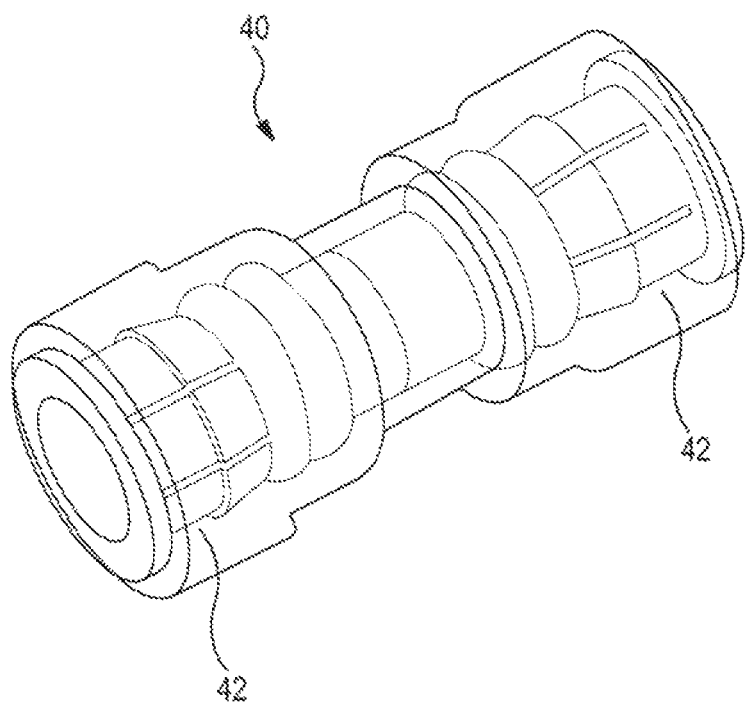
FIG. 7 is a partial cut away perspective view of a double O-ring connector.
Figure 8:
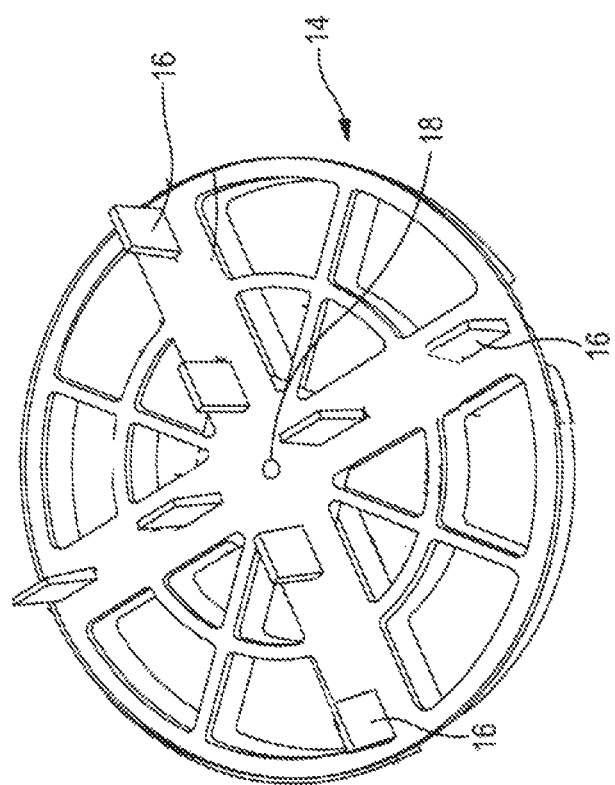
FIG. 8 is a top perspective view of an alignment ring with spacing tabs for four thermal pavers.

Referring to FIG. 2, there is shown a perspective view of an array of nine thermal panels 10 mounted on pedestals 12 where the pavers may be made of various materials, such as, but not limited to, concrete pavers, concrete slabs, concrete flags or flagstones, poured in place concrete, pre-cast concrete, sand, natural stone, stucco, roofing tiles, glass, ceramic, clay, brick, metal, crushed stone, gypcrete, or aggregates. The pavers may be mounted on pedestals which are height adjustable or have a fixed height. In another embodiment the pavers may be set on a bed of sand.

in an embodiment where the thermal panels are located on pedestals, each thermal panel can be located on an alignment ring. Referring to FIG. 8, there is shown a top perspective view of an alignment ring 14 which may be coupled to the top of a pedestal which has a height that is fixed or variable. The corner alignment 14 can have the following features such as but not limited to (a) vertical tapered tabs 16 that provide proper alignment of the paver/slabs, (b) weep holes 18 to allow water to drain out, and (c) grooves 20 molded into the horizontal plate to allow for easy cutting of the pedestals into halves or quarters. The alignment ring provides tapered vertical tabs on the top surface to provide the proper spacing between multiple thermal panels. The corner alignment ring 14 provides solid support for the corners of the thermal panels and is designed to sit on and align with most commonly used pedestal supports. The alignment ring is seated under each corner of a thermal panel after the thermal panel has been connected to other thermal panels using the connector shown in FIG. 7.

Figure 3:
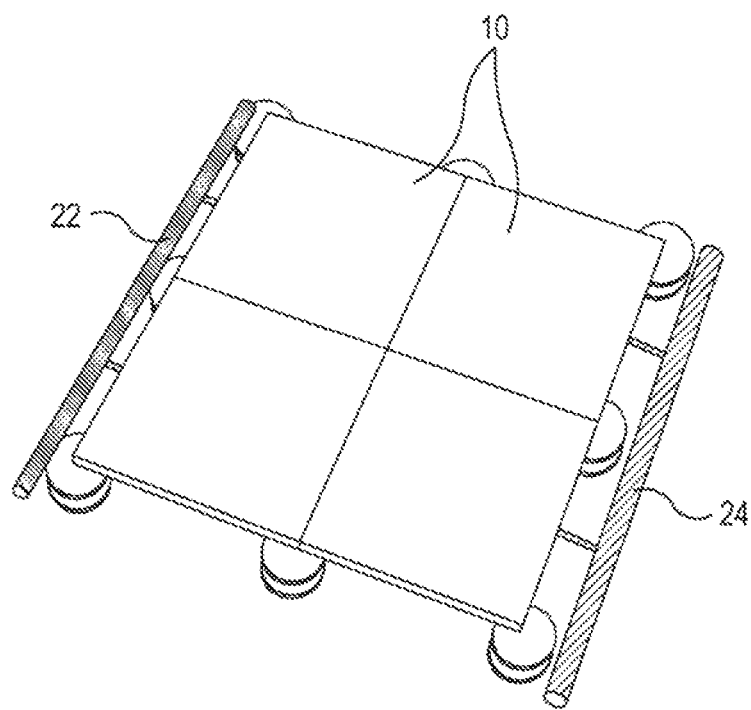
FIG. 3 is a perspective view of an array of four thermal panels mounted on corner pedestals with the cold fluid inlet conduit on the right side and the hot fluid out put conduit on the left side of the array in accordance with the principles of the invention.

Referring to FIG. 3, there shown is a perspective view of an array of four thermal panels mounted on corner pedestals connected to a cold fluid inlet conduit on one side and a hot fluid output conduit on the other side of the array. In use, in hot weather, a heat transfer fluid may be pumped from the conduit 22 on one side of the array of thermal panels, through the array of panels to heat the fluid and cool the paver surface, then to the conduit 24 on the other side of the array of thermal panels. The heated fluid in the conduit 24 may now be pumped to a heat exchanger to warm water in a pool. Thus, the surface of the thermal pavers is kept cool and comfortable for walking while, at the same time, solar energy is being used to warm water in a pool. This process can be used to cool a pool in hot climates in the evening by transferring heat from the pool water to the cool paver surface. In the winter time the flow of fluid through the thermal panels may be modified where warm or heated fluid such as an anti-freeze heat transfer fluid that is heated from a geothermal system is pumped through the thermal panels to melt snow or ice on the surface of the panels by warming the thermal panels.

Figure 4:
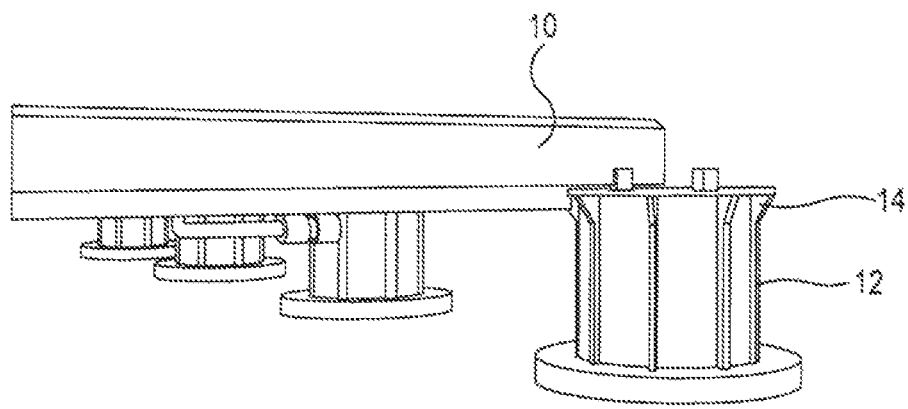
FIG. 4 is a side elevation view of an array panels mounted on pedestals with alignment tabs.

Referring o FIG. 4, there is shown a side elevation view of an array of thermal panels 10 coupled to corner alignment ring 14 attached to pedestals 12 which may rest on a support base of concrete, sand, quarry dust, etc.

Figure 5:
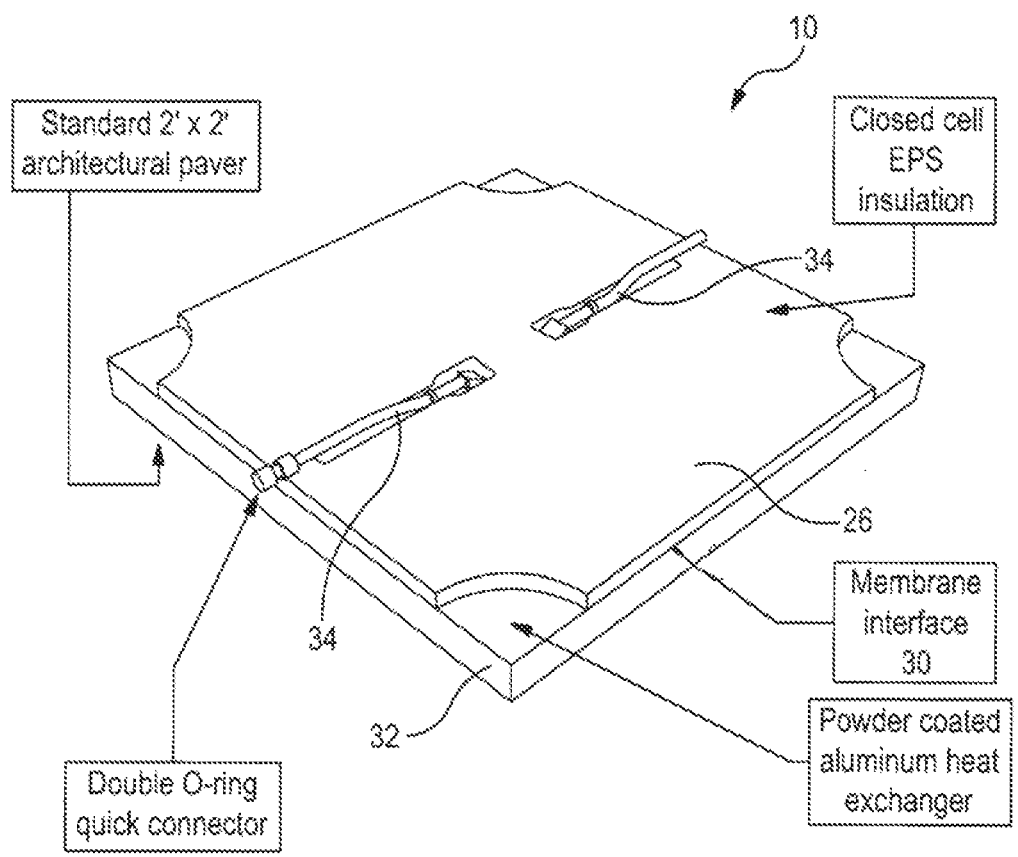
FIG. 5 is a perspective view of the bottom of a single thermal panel.

Referring to FIG. 5, there is shown a perspective view of the bottom surface of a single thermal panel 10. The thermal paver assembly consists of sheet of insulation 26 located on the bottom of a heat exchanger 28, which is located on the bottom of a gap filling membrane interface 30, which is in full edge to edge contact with the bottom surface of the paver 32. The bottom insulating panel 26 can, but is not required to be attached to the heat exchanger. The insulation helps to keep the thermal energy concentrated between the paver and the heat exchanger. The insulating panel 26 can be attached to the heat exchanger with, but not limited to friction, adhesive, mechanical, over molding, etc. The insulating panel 26 can be of any thickness or type that is suitable for the given application such as but not limited to expanded or extruded polystyrene, icynene, urethane, styrene, etc. The preferred material is extruded polystyrene which has the following attributes; impervious to water infiltration, impervious to insect infestation, insulates, provides rigidity to the heat exchanger, and can be attached to the heat exchanger with either an adhesive, friction or mechanical means.

Quarter circle cut outs at the corners of the insulation material expose the bottom horizontal plane of the heat exchanger and are provided for receiving the corner alignment ring 14 or the pedestal mounts which contact the heat exchanger. Two slots 34 are located in the insulation panel for the aluminum inlet and outlet fluid conduction tubes which are connected to the heat exchanger. As reflect in Figs 6, the heat exchanger has a channel inlet and a channel outlet which are used to connect the heat exchanger to the inlet and outlet fluid conduction tubes. As reflected in Figs. 5 and 6, the channel inlet and channel outlet are position near the central regions of the thermal mass unit, the insulation panel and the heat exchanger, which are all aligned, such that the channel inlet and the channel outlet are offset from the edges of the thermal mass.

Figure 6:
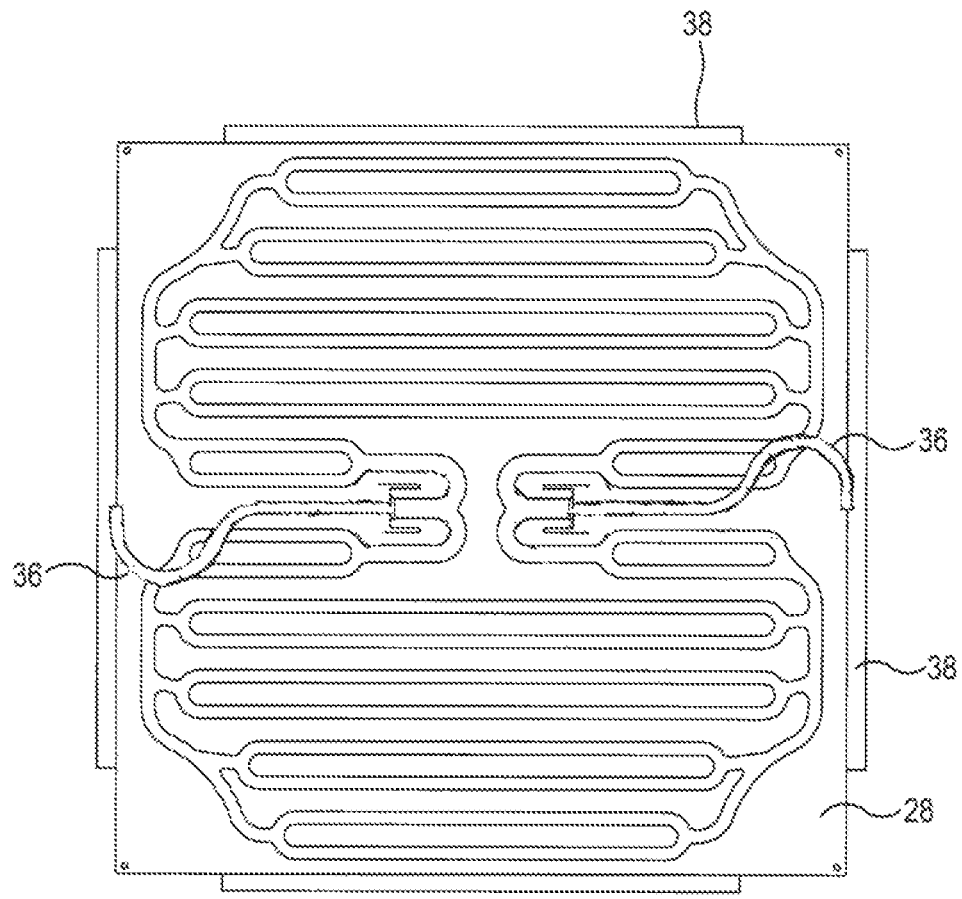
FIG. 6 is a bottom plan view of a roll bonded heat exchanger.

Referring to FIG. 6, there is shown a plan view of one iteration of the roll bonded heat exchanger 28 which is sandwiched between a thermal mass unit and a layer of insulation. The heat exchanger is substantially the same size as the paver or may be slightly smaller than the thermal mass unit to which it is attached, and the tubes of the heat exchanger have a cross section or shape that will allow for an efficient flow of the fluid through the heat exchanger. The cross sectional shape of the tubes of the heat exchanger may have, but not limited to, a D shape, half round shape, triangular shape, round shape or semicircular shape. Inlet and outlet tubes 36 are attached to the heat exchanger which allow for the use of standard size, American or metric connectors. Tabs 38 which are located along each edge of the heat exchanger and are perpendicular to the heat exchangers primary surface 28 have a width necessary to prevent the panel from sagging or bending under its own weight thus breaking contact with the bottom of a paver above. When used in conjunction with pedestal mounts, the tabs are held back from the corners of the panel to allow for the placement of pedestals or corner alignment rings directly to the horizontal bottom plane of the panels, thus allowing for a lower height profile between the pedestal and the paver. Attached to an end of one of the tubes of the heat exchanger, and preferably the inlet tube 36 of the heat exchanger, is a push on leak proof connector 40, which may or may not include double O-rings and may or may not have a locking collet 42 at each end, see FIG. 7.

For an application that requires a flexible, non-damaging, removable connection, such as when used in conjunction with pavers and pedestals, female by female, non-flow restricting push on fittings or connectors 40, that utilize two O-rings on each side of the joint are the preferred interconnection between the inlets and outlets of the tubes. The connection design allows for flex and expansion and contraction between the units without leaking. The double O-rings provides redundancy where leaking cannot be tolerated. In a situation where flex may be encountered, the double o-rings will provide additional support to the connection. It should be noted that for permanent, well supported applications such as under poured concrete, or on a sub-floor, any suitable connector type can be used. The push on connectors can be made of materials such as but not limited to plastic, brass, stainless steel, bronze, copper, rubber. The preferred connector may be made of plastic due to its low cost and resistance to corrosion. The O-rings may be made from a material suitable to the intended temperature range, chemical exposure and life expectancy for each application.

The connector 40 for connecting the individual thermal panels together may be used to create rows of the thermal panels. Further, it should be noted that the rows may be connected to supply and return tubes via a manifold, to form an array. It should be further noted that the supply and return tubes may be routed and attached to an object such as but not limited to a heat exchanger, water heater, chiller, geothermal loop, solar panel, swimming pool circulation loop, fountain, boiler, under water pipe loop or septic system loop. It should still further be noted that a fluid such as but not limited to water, ethylene glycol, or other suitable fluid may be transited through the manifold for the purpose of transferring thermal energy into or out of adjoining thermal panels.

When metal is used to manufacture the thermal panels, a closed loop system is the preferred system type for the transfer of thermal energy to or from a potable water system. The preferred heat transfer fluid in the closed loop portion of the system should have, but is not required to have, anti-corrosion properties. Where a system is susceptible to freezing temperatures, a closed loop system should be used with the heat transfer fluid in the closed loop comprising an anti-freeze solution such as, but not limited to glycol.

The elements are connected as follows: the tubes 36 are connected to consecutive tubes of adjacent thermal units using a leak proof connector between the inlet and outlet of each thermal unit to form a row of tubular units. Further, this invention may also have but is not required to have, one or more of the following: a plurality of rows of thermal units where, the inlet and outlet of each row would be connected to a common supply tube and common return tube using connectors. It should be further noted that this invention may also have but is not required to have a rigid insulation panel attached to the bottom of each thermal paver. A connector may be, but not limited to a female by female, push on type utilizing O-ring seals, or glue on, or compression type. Push on with O-ring seals is preferable. The insulation if used may be made of various materials, such as but not limited to extruded polystyrene, expanded polystyrene, icynene, polyurethane, isocyanurate or any other rigid insulation, but extruded polystyrene is preferable. When pre-formed concrete pavers/slabs are used, it may be preferable, but not required, to apply a layer of thermal mastic or thermal membrane between the heat exchanger and the paver in a thickness as needed to fill any voids between the two surfaces for the purpose of increasing the thermal transfer efficiency between the two components. Thermal mastic is a non-hardening, paste that has excellent thermal transference properties.

The modular nature of the invention provides for expansion and contraction between the thermal panels as they heat and cool over a wide spectrum of temperatures, are easily installed, repaired or replaced; are usable with paver/slabs that are elevated on pedestals; and can be easily dismantled and reassembled to allow for underlying roof/substrate repairs.

When used in an exterior application, the invention becomes an invisible solar collector array, thus allowing for solar collection of energy where conventional exposed solar collectors are not suitable or allowed for aesthetic or practicality reasons. Further it should be noted that the invention provides for multiple use applications such as but not limited to; (a) solar gain to heat domestic hot water in warm weather, switchable to snow melt in the winter months; (b) solar gain up to the capacity of the storage medium then switching to a geo thermal loop for cooling of the attached thermal mass; (c) using a geo thermal loop to cool the thermal mass in hot weather and to snow melt the thermal mass in the winter; (d) heat domestic water while cooling the roof to help reduce heat blooms in cities thus potentially qualifying for "cool roof" status or LEED points where required or desired; (e) add a water chiller unit into the loop to add additional cooling to the thermal mass to cool patios, swimming pool patios, or roof top patios, in high heat environments; (f) use in applications that require a cool or hot space without the mechanically induced movement of air.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A modular thermal panel comprising:
   a thermal mass unit having a top and bottom surface and a plurality of outer edges with a central region disposed centrally between the outer edges;
   a heat exchanger having connected top and bottom panels with channels formed there between for receiving a heat exchange fluid, the top panel of the heat exchanger being coupled to the bottom surface of the thermal mass unit, the heat exchanger having a channel inlet and a channel outlet which are positioned near the central region of the thermal mass, such that the channel inlet and the channel outlet are offset from the edges of the thermal mass;
   an insulation layer having a top surface and a bottom surface, the top surface of the insulation layer being coupled to the bottom surface of the heat exchanger, and such that the heat exchanger is effectively sandwiched between the thermal mass unit and the insulation layer, with groves formed into the bottom surface of the insulation layer;
   inlet and outlet tubes coupled to the channel inlet and the channel outlet of the heat exchanger, respectively, for feeding heat exchange fluid to and from the heat exchanger, the inlet and outlet tubes being positioned within the groves formed into the bottom surface of the insulation layer;
   wherein the edges of the heat exchanger are substantially aligned with the edges of the thermal mass;
   wherein the heat exchanger is made of thermally transmissive material including polymers, stainless steel, aluminium, or copper; and
   wherein the thermal mass unit is made of a material which includes modular or formed in place concrete, cement, gypsum concrete, or stone.

2. The modular thermal panel of claim 1 wherein, when the thermal mass unit is coupled to a pedestal:
   corners of the insulation layer are removed to expose corners of the heat exchanger;
   a corner alignment ring is located between a pedestal and a corner of the thermal mass unit and contacts a corner of the heat exchanger; and
   the insulation layer is coupled to the bottom panel of the heat exchanger.

3. The modular thermal panel of claim 2 wherein the corner alignment ring is made of polymers, stainless steel, copper, aluminum or rubber.

4. The modular thermal panel of claim 3 wherein the insulator layer is made of expanded or extruded polystyrene, icynene, urethane or isocyanurate.

5. The modular thermal panel of claim 3 wherein the corner alignment ring located at the corner of the thermal mass unit hold the thermal mass unit in place laterally.

6. The modular thermal panel of claim 5 wherein the corner alignment ring includes vertical alignment tabs for aligning and securing one or more adjacent thermal mass unit in place relative to each other.

7. The modular thermal panel of claim 6 wherein the corner alignment ring includes slots for facilitating cutting of the corner alignment ring into halves or quarters.

8. The modular thermal panel of claim 7 wherein the corner alignment ring has a center boss with a pre-formed hole for receiving a fastener which allows the corner alignment ring to be fastened mechanically to a pedestal or substrate.

9. The modular thermal mass unit of claim 8 wherein the corner alignment ring allows the transfer of weight of the thermal mass unit to be transferred to an underlying pedestal.

10. The modular thermal panel of claim 1 wherein at least one of the inlet or outlet tubes to the heat exchanger is coupled to a connector.

11. The modular thermal panel of claim 10 wherein the connector comprises an O ring that creates a waterproof seal.

12. The modular thermal panel of claim 11 wherein the connector is at least one of a union connector, a friction fit connector, a soldered connector, a brazed connector or a welded connector.

13. The modular thermal panel of claim 1 wherein the inlet and outlet tubes of the heat exchanger are round.

14. The modular thermal panel of claim 13 wherein a coating of thermal mastic is sandwiched between the top panel of the heat exchanger and the bottom surface of the thermal mass unit.

15. The modular thermal panel of claim 14 wherein a membrane interface is located between the thermal mass unit and the heat exchanger.

16. The modular thermal panel of claim 1 wherein the thermal mass unit is an architectural paver with a thickness of three inches or less.

* * * * *